(12) United States Patent
Carey et al.

(10) Patent No.: US 6,631,260 B1
(45) Date of Patent: Oct. 7, 2003

(54) METHOD OF ROUTING CALLS TO PERIPHERAL DEVICES

(75) Inventors: Christopher P. Carey, Elmhurst, IL (US); Niall Cornelius J. Lucey, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 275 days.

(21) Appl. No.: 09/611,640

(22) Filed: Jul. 7, 2000

(51) Int. Cl.[7] ................................................ H04Q 7/20
(52) U.S. Cl. ..................... 455/428; 455/445; 455/414; 455/416; 455/462; 455/461; 379/88.04; 379/88.24
(58) Field of Search ............................. 455/428, 445, 455/433, 414; 379/88.04, 88.24

(56) References Cited

U.S. PATENT DOCUMENTS 5,839,072 A  * 11/1998  Chien ......................... 455/445
6,097,963 A  *  8/2000  Boltz .......................... 455/518
6,201,806 B1 *  3/2001  Moffett ....................... 370/356
6,389,118 B1 *  5/2002  Martinez .................. 379/88.24

* cited by examiner

Primary Examiner—William Trost
Assistant Examiner—Brandon J. Miller
(74) Attorney, Agent, or Firm—Susan L. Lukasik; Lalita W. Pace

(57) ABSTRACT

A method of the present invention includes an MSC (101) receiving (201) a request for a call. A call routing request indicating that no peripheral device interaction has taken place on the call is forwarded (203) to an HLR or home location register (107). The MSC receives (205) call routing instructions that direct the call to a peripheral device (109). The call is routed (211) to the peripheral device (109). The peripheral device (109) performs (213) a function for the call and routes (215) the call to the MSC. A message requesting call routing instructions and identifying the peripheral device is forwarded (203) to the HLR.

8 Claims, 2 Drawing Sheets

US 6,631,260 B1

METHOD OF ROUTING CALLS TO PERIPHERAL DEVICES

FIELD OF THE INVENTION

This invention relates to communication systems, including but not limited to calls involving peripheral devices in communication systems.

BACKGROUND OF THE INVENTION

Communication systems are known to comprise an infrastructure, typically including a plurality of base stations, a controller, a home location register (HLR), and a mobile switching center (MSC), that provides communication services to communication units located in corresponding service coverage areas of the base stations. One example of such a communication system is a cellular communication system. In a cellular system, a remote unit (e.g., a mobile or portable radiotelephone) that desires to communicate, sends a channel request message to a base station serving the coverage area in which the remote unit is located. Upon receiving the channel request message, the infrastructure of the cellular system allocates a communication channel for the communication, and the remote unit begins communicating with a telephone network subscriber or another remote unit via the serving base station. Typically, multiple access wireless communication between the base station and the remote stations occurs via radio frequency (RF) channels that provide paths over which communication signals such as voice, data, and video are transmitted.

In order to provide desirable features for a call, such as pre-paid cellular service, menu-driven information extraction, selective call acceptance, voice recognition, and wiretap to name a few, a peripheral device may be added to a communication system. Calls to or from a remote unit may be diverted to the peripheral device that performs its function and then redirects the call back to the MSC so that the call may proceed. Control of routing for calls involving a peripheral device is typically performed by an HLR via originating and terminating triggers detected by the MSC. When a trigger is detected, the MSC informs the HLR, typically by invoking an ANSI-41 standard operation. The HLR determines from the remote unit's service profile that a peripheral service should be invoked and returns to the MSC routing instructions for the peripheral device.

ANSI-41 defines the operations that are used for trigger detection and HLR involvement in call routing decisions as single TCAP (Transaction Capability Application Part) transaction, i.e., transactions occur without recording a history. TCAP is a transaction-oriented protocol defined for use with Signaling System No. 7, as is known in the art. For a call that needs to be routed to only a single peripheral device, a single TCAP transaction will suffice. When transactions with one or more peripheral devices must be provided for a call, the single TCAP transaction operations used by the HLR present a problem because the HLR has no way of knowing which peripheral device, if any, has already been invoked or which peripheral device should be invoked next. If present ANSI-41 operations were to be used to invoke one or more different peripheral devices, the call would likely end up in an endless loop trying to access the first peripheral device involved in the call.

Accordingly, there is a need for a method of routing a call to one or more peripheral devices prior to call completion.

DESCRIPTION OF A PREFERRED EMBODIMENT

Figure 1:
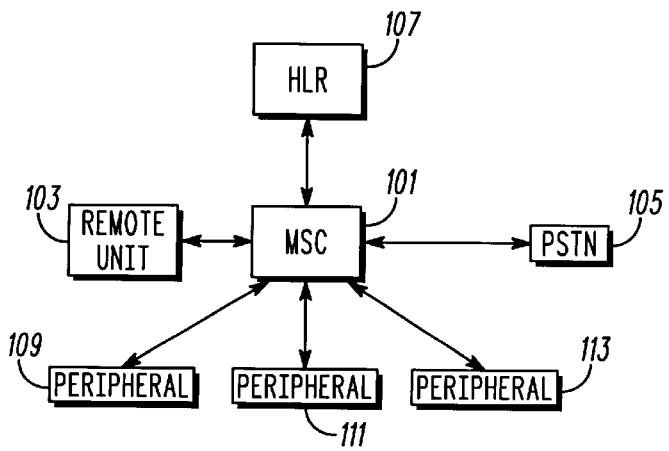
FIG. 1 is a block diagram of a communication system in accordance with the invention.

The following describes an apparatus for and method of routing a call to one or more peripheral devices. A Peripheral Service Identifier (PSI) is included in messages between the MSC and HLR in order to identify call peripheral device interaction, and thereby functions completed by peripheral devices for a particular call, and to identify which peripheral device that call should be routed to next. In this way, any number of peripheral devices may be successfully accessed for a call.

A method of the present invention comprises the steps of an MSC receiving a request for a call; forwarding, to a home location register (HLR), a call routing request indicating that no peripheral device interaction has taken place on the call; the MSC receiving call routing instructions that direct the call to a peripheral device; and routing the call to the peripheral device. The peripheral device performs a function for the call and routes the call to the MSC. A message requesting call routing instructions and identifying the peripheral device is forwarded to the HLR. The method may also comprise the steps of the MSC receiving call routing instructions that direct the call to completion and routing the call to complete the call. The method may also comprise the steps of the MSC receiving call routing instructions that direct the call to a second peripheral device and routing the call to the second peripheral device. The second peripheral device performs a function for the call and routes the call to the MSC. A message requesting call routing instructions and identifying the second peripheral device is forwarded to the HLR. Additionally, upon receipt of the message requesting call routing instructions, the HLR may determine what call routing instructions are to be forwarded based on the peripheral device interaction that has taken place for the call. The step of requesting call routing instructions may indicate no further peripheral device interaction should take place for the call. Upon receipt of the message requesting call routing instructions indicating no further peripheral device interaction, it is determined what call routing instructions are to be forwarded, which routing instructions may omit all subsequent peripheral device interaction for the call.

A method that may be performed by an HLR in accordance with the invention comprises the steps of receiving a first call routing request indicating a first peripheral device interaction for the call and based on the indicated peripheral device interaction for the call, determining call routing instructions that direct the call to a peripheral device. A second call routing request indicating a second peripheral device interaction for the call or no further peripheral device interaction for the call may be received. The indication of a first peripheral device interaction for the call may comprise an identification of a first peripheral device. The indication of a first peripheral device interaction for the call may comprise a notification that no peripheral device has been active in the call. The indication of a first peripheral device interaction may comprise an instruction that further peripheral device interaction be omitted for the call.

A method performed by a mobile switching center (MSC) in accordance with the invention comprises the steps of receiving a request for a call; forwarding to an HLR a call routing request indicating that no peripheral device interaction has taken place on the call; receiving call routing instructions that direct the call to a peripheral device; routing the call to the peripheral device; and once the call is routed back to the MSC, forwarding, to the HLR, a message requesting call routing instructions and identifying the peripheral device. The method may also comprise the steps of the MSC receiving call routing instructions that direct the call to completion and routing the call to complete the call. The method may further comprise the steps of receiving call routing instructions that direct the call to a second peripheral device; routing the call to the second peripheral device; performing, by the second peripheral device, a function for the call; and once the call is routed back to the MSC, forwarding, to the HLR, a message requesting call routing instructions and identifying the second peripheral device. The method may further comprise the step of forwarding, to the HLR, a call routing request indicating that further peripheral device interaction be omitted for the call.

As seen in FIG. 1, an MSC 101 is operably coupled to one or more remote units 103, the Public Switched Telephone Network (PSTN) 105, a Home Location Register (HLR) 107, and a plurality of peripheral devices 109, 111, and 113. In the preferred embodiment, the MSC is an EMX-V available from Motorola, Inc. The MSC generally performs the functions of audio circuit switching, call routing based on dialed digit analysis, call progress treatment, call failure treatment, billing record generation, and so forth. The HLR is a model HLR41 available from Motorola, Inc. The HLR generally performs the functions of storage of mobile subscriber profile records, validation of mobile subscriber system accesses, trigger based call processing control, and so forth. The peripheral devices 109, 111, and 113 include devices that perform functions such as voice recognition, password call access, selective call acceptance, menu driven interaction, pre-paid cellular phone, wiretaps, and so forth. Although only three peripherals are shown, the present invention may be successfully practiced with any number of peripheral devices.

Figure 2:
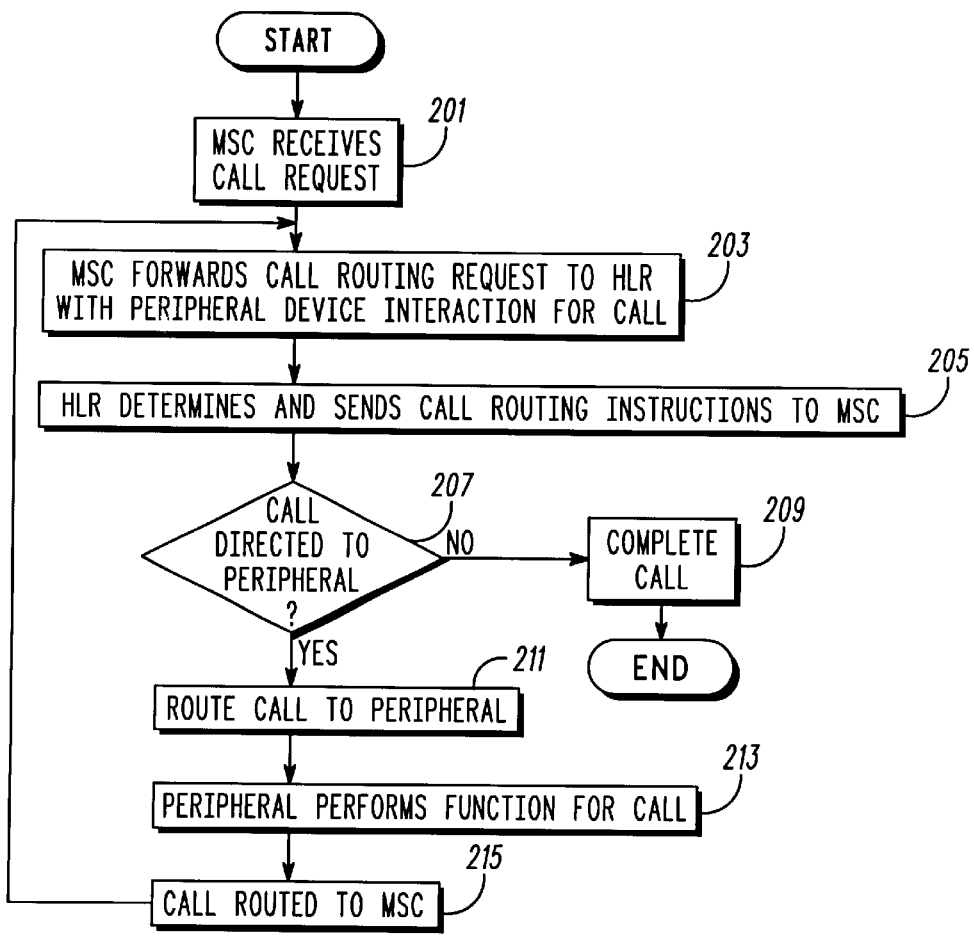
FIG. 2 is a flowchart showing a method of routing a call to multiple peripheral devices in accordance with the invention.

A flowchart showing a method of routing calls to peripheral devices is shown in FIG. 2. At step 201, the MSC 101 receives a call request from a remote unit 103 or the PSTN 105 requesting a call to a remote unit 103. The MSC forwards the call routing request to the HLR with peripheral device interaction for the call at step 203. The first time through the process, i.e., the first time step 203 is invoked, the peripheral device interaction for the call is an indication that no previous peripheral device interaction has taken place for the call.

In the preferred embodiment, peripheral device interaction is indicated by the inclusion of a Peripheral Service Identifier (PSI). In the preferred embodiment, the PSI has a parameter identifier and a length identifier that defines the PSI as an eight-bit (single octet) parameter. In the preferred embodiment, the PSI is included as an additional optional parameter in standard ANSI-41 messaging. In the preferred embodiment, each different PSI correlates to a different MSC trunk group that attaches a peripheral device to the MSC. A trunk group is a logical collection of trunk circuits that are provisioned with similar characteristics, e.g., signaling type and connected equipment. The MSC 101 treats any call received on a particular trunk group as a remote unit origination by the subscriber identified in the calling party number and performs the trigger detection processing normally associated with a remote unit origination or termination.

Typically, the PSI is included with call routing requests and/or call routing instructions as appropriate for a particular call. In the preferred embodiment, the first time step 203 is invoked is directly after the call request is received, hence no peripheral device interaction has taken place. In the preferred embodiment, no PSI is sent the first time step 203 is invoked, and the HLR interprets a lack of PSI as an indication that no previous peripheral device interaction has occurred for that call. Alternatively, a PSI may be given a numerical value, such as 11111111 or 255, to indicate that no previous peripheral interaction has occurred for the current call. Optionally, the MSC 101 may reflect the PSI from the HLR's call routing instructions in the MSC's next call routing request after the call goes through a peripheral device, which process eliminates the need for operator provisioning of the PSI at the MSC 101 and simplifies call set-up.

At step 205, the HLR determines and sends call routing instructions to the MSC, which call routing instructions may direct the call to a peripheral device 109. If at step 207 the call is not directed to a peripheral device, the process continues to step 209, where the call is completed (e.g., processed by routing the call to its intended destination), and the process ends. If at step 207, the call is directed to a peripheral device, the process continues with step 211, where the call is routed to the peripheral device 109 indicated in the call routing instructions at step 205. That peripheral 109 then performs its designated function, such as pre-paid phone authorization, for this particular call at step 213, the call is routed to the MSC at step 215, and the process continues with step 203. Each time through the loop of the process (steps 203 through 215), the MSC indicates the appropriate last peripheral device that interacted with the call at step 213. The HLR is thereby notified where in the process the call is, such that the HLR can then route the call sequentially through multiple different peripheral devices. This particular process does not involve any modification to the peripheral devices 109, 111, and 113, although the MSC 101 and HLR 107 are modified appropriately to perform the steps at the flowchart of FIG. 2.

An alternative feature of the present invention is the ability to set the PSI to a value, such as zero in the preferred embodiment, that indicates to the HLR to omit all further peripheral device interaction for the current call. If for some reason, such as a mobile to mobile call in which both mobiles have services provided by the same peripheral device and the service can be performed with a single interaction the HLR will be instructed to omit or pass over all further routing instructions that involve peripheral devices, such that the call routing continues after the peripheral device interactions should have occurred. The benefit of this operation is to conserve trunk resources and decrease call set-up time.

An optional feature of the present invention involves a sequencing or ordering scheme that effectively counts down the peripheral devices in a call. For example, if three peripheral devices 109, 111, and 113 invoking three features, such as pre-paid originating caller, wiretap, and selective call acceptance, respectively. In the preferred embodiment, the HLR 107 assigns the order of the peripheral devices in the order the devices will be invoked during the call. For example, the first device 109 providing a pre-paid originating caller feature would have a PSI of 3, the second device 111 providing a wiretap feature would have a PSI of 2, and the third device 113 providing selective call acceptance would have a PSI of 1. Each time through the loop of FIG. 2, the HLR 107 would know to reduce the PSI by one to easily determine the next peripheral device to interact in the call. When the PSI returned by the MSC reaches 1, the HLR 107 would know that the last peripheral device 113 has processed the call. Alternatively, the devices could be ordered in increasing order, and each time through the loop of FIG. 2, the HLR would increase the PSI by one to determine the next device. When a predetermined fixed number for each remote unit is reached, the HLR 107 would know that the last peripheral device 113 has processed the call. This feature provides for easy, yet efficient, software coding. In the preferred embodiment, peripheral devices 109, 111, and 113 are invoked or accessed in the order in which they are provisioned in a remote unit's (i.e., subscriber's) record. When the HLR receives a request for call routing instructions, the HLR 107 examines any PSI contained in the request and invokes the next peripheral device in the ordered list until all peripheral devices, and hence the services they provide, have been invoked. Thus, the order of the peripheral devices need not be sequential, i.e., the invocation order could be PSI 2, PSI 1, and PSI 3.

Figure 3:
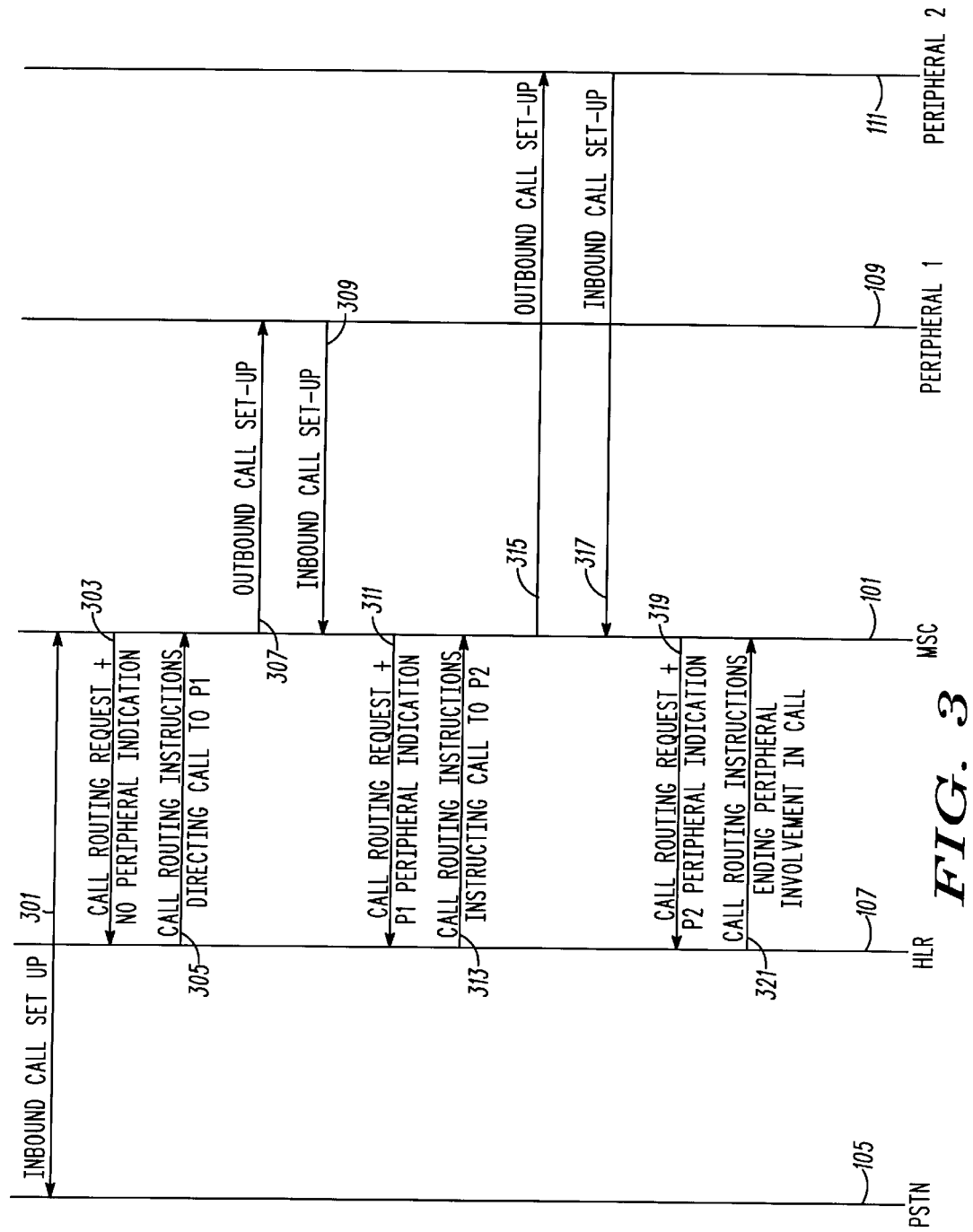
FIG. 3 is a flow diagram showing a method of routing a call to multiple peripheral devices in accordance with the invention.

A flow diagram or bounce chart showing a method of routing a call to multiple peripheral devices is shown in FIG. 3. The flow diagram shows messaging between the PSTN 105, HLR 107, MSC 101, and two peripheral devices 109 and 111. The first message 301 is an inbound call set-up message that includes the called party number, or Mobile Directory Number, (MDN) that represents the unambiguous number for the intended recipient of the call. In the example shown, the first message 201 is the origination of a call from a land-based party via the PSTN 105 to a remote station 103. The first message 301 is sent from the PSTN 105 to the MSC 101. In response to the call set-up message, the MSC 101 sends a call routing request plus a no peripheral activity indication in a message 303 to the HLR 107. A no peripheral indication, which indication tells the HLR that no peripheral device has yet interacted with the call, is comprised, in the preferred embodiment, may be accomplished by sending a PSI with a value indicating no PSI involvement. In the preferred embodiment, a no peripheral indication is achieved by not sending a PSI, and because the HLR 107 may expect to see one in the messaging sequence, the HLR 107 interprets the lack of a PSI as no previous peripheral involvement.

Upon receipt of the call routing request, the HLR 107 determines whether the intended communication unit 103 for the call has the peripheral services provision. In the example shown in FIG. 3, the intended remote unit 103 has two peripheral services provisioned. The first peripheral service to be provided for the call is pre-paid service authorization, with PSI=2, and the next service to be provided is selective call acceptance, with PSI=1. Because at this point in the process, a no peripheral activity indication was received by the HLR 107, the HLR retrieves the PSI of the first peripheral service to be provided. The HLR 107 sends call routing instructions directing the call to the first peripheral device 109 in a message 305 to the MSC 101, which message 305 prepends the peripheral routing digits associated with the first peripheral device's 109 service to the MDN.

Upon receipt of this message 305, in the preferred embodiment, the MSC analyzes the returned peripheral routing digits to determine the outward route. The outward route is a trunk group connected to the pre-paid service authorization peripheral 109. The MSC removes the peripheral routing digits prepended to the MDN, selects an idle trunk from the trunk group, and routes the call to the peripheral 109 by sending an outbound set-up message 307 to the first peripheral device 109, which message 307 includes the MDN as the called party number. The peripheral device 109 performs its function and sends an inbound call set-up message 309 to the MSC, thereby routing the call back to the MSC 101.

The MSC retrieves the PSI associated with the trunk group, i.e., PSI=2, for the pre-paid service authorization peripheral 109 and passes the information to the HLR in a message 311, comprising another call routing request and a peripheral indication of PSI=2, to the HLR 107. Because a PSI was received by the HLR 107 in the call routing request, indicating the previously accessed peripheral device, the HLR 107 selects the next peripheral in sequence to be provided to this remote unit 103. In this example, the next peripheral is a selective call acceptance service 111. The HLR 107 retrieves the peripheral digits associated with this service and prepends them to the MDN in a message 313, to the MSC 101, that sends call routing instructions directing the call to a second peripheral device 111.

Upon receiving the instructions 313, the MSC 101 analyzes the returned peripheral routing digits to determine the outward route. The MSC removes the peripheral routing digits prepended to the MDN, selects an idle trunk from the trunk group, and routes the call to the second peripheral device 111 by sending an outbound set-up message 315 to the second peripheral device 111, which message 315 includes the MDN as the called party number. The second peripheral device performs its function, i.e., selective call acceptance service for the intended recipient of the call, and sends an inbound call set-up in a message 317 to the MSC 111, thereby rerouting the call back to the MSC 101. Upon return of the call to the MSC, it sends a call routing request plus a peripheral indication of PSI=1 in a message 319 to the HLR 107, indicating that the function of the peripheral 111 associated with that trunk group has been completed, which information is passed to the HLR 107. Because the HLR has received an indication of the last peripheral on the HLR's list for this particular user, the HLR 107 determines that there are no longer any peripheral services provisioned for this call, and sends call routing instructions indicating the end of peripheral involvement in this call in a message 321 to the MSC 101. The MSC then completes the processing of the call in a manner as is known in the art.

The present invention provides an algorithm that more flexibly controls access to multiple peripheral devices for a call on a user or subscriber basis. Peripheral devices may be ordered or sequenced in a strategic order that makes HLR processing short and simple. The PSI provides the HLR with a way to track and control the sequence in which peripheral devices are invoked during a single call. This level of control and flexibility provided by the present invention is not possible using previous permanent connection or source group routing techniques. Because the ANSI-41 protocol does not provide for access to multiple peripheral devices on a single call, the present invention fills a gap in that standard. The present method provides for routing of a call to multiple peripheral devices without requiring communications between the HLR and the peripheral devices, or the connections and bandwidth necessary to provide such communication. The present invention is simple and inexpensive to implement, particularly in terms of lines of code, while providing a flexible yet useful algorithm.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   receiving, by a mobile switching center (MSC), a request for a call;
   forwarding, to a home location register (HLR), a call routing request indicating that no peripheral device interaction has taken place on the call;
   receiving, by the MSC, call routing instructions that direct the call to a first peripheral device;
   routing the call to the first peripheral device;
   forwarding, to the HLR, a call routing request indicating that interaction with the first peripheral device has taken place on the call
   receiving, by the MSC, call routing instructions that direct the call to a second peripheral device; and
   routing the call to the second peripheral device.

2. The method of claim 1 wherein after the step of routing the call to the first peripheral device, the method comprises the steps of:
   performing, by the first peripheral device, a function for the call; and
   routing the call to the MSC.

3. The method of claim 1, further comprising the steps of:
   receiving, by the MSC, call routing instructions that direct the call to completion; and
   routing the call to complete the call.

4. The method of claim 1, further comprising the steps of:
   performing, by the second peripheral device, a function for the call;
   routing the call to the MSC; and
   forwarding, to the HLR, a call routing request indicating that interaction with the second peripheral device has taken place on the call.

5. The method of claim 1, further comprising the step of requesting call routing instructions indicating no further peripheral device interaction should take place for the call.

6. The method of claim 5, further comprising the step of, upon receipt of the message requesting call routing instructions indicating no further peripheral device interaction, determining what call routing instructions are to be forwarded, which routing instructions omit all subsequent peripheral device interaction for the call.

7. A method comprising the steps of:
   receiving a first call routing request indicating that no peripheral device interaction has taken place on a call;
   based on the indicated peripheral device interaction for the call, determining call routing instructions that direct the call to a first peripheral device;
   receiving a second call routing request indicating one of a first peripheral device interaction for the call and no further peripheral device interaction for the call;
   when the second call routing request indicates a first peripheral device interaction for the call, determining call routing instructions that direct the call to a second peripheral device based on the indicated first peripheral device interaction for the call.

8. The method of claim 7, wherein the indication of a first peripheral device interaction for the call comprises an identification of a first peripheral device.

* * * * *